(No Model.)　　　　　　　C. M. KIMBALL.　　　　3 Sheets—Sheet 1.
Railway Car.
No. 238,239.　　　　　　　　　　Patented March 1, 1881.
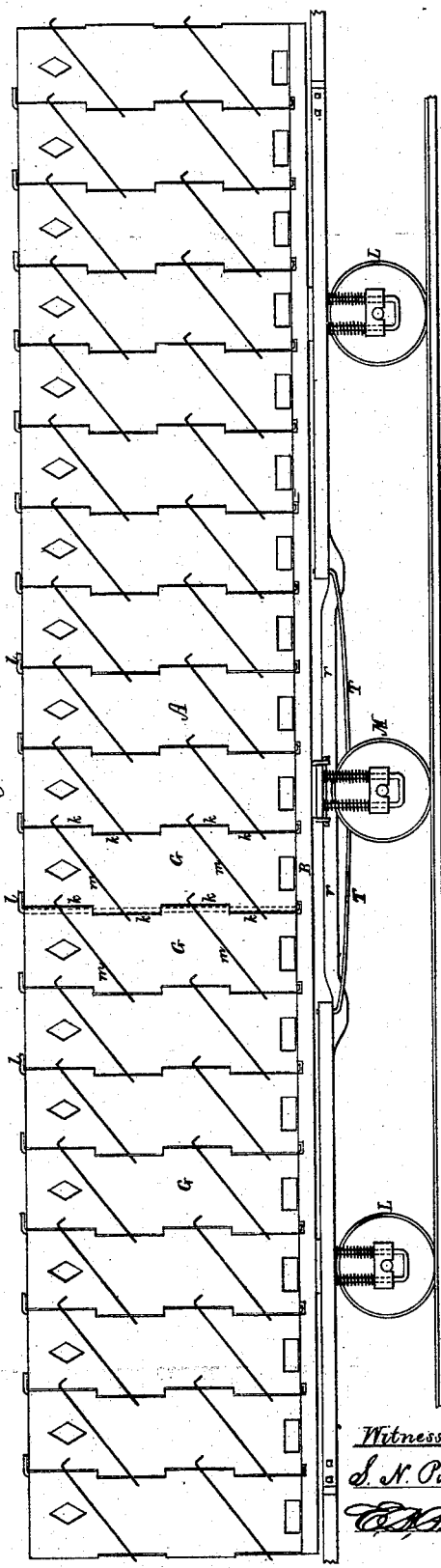
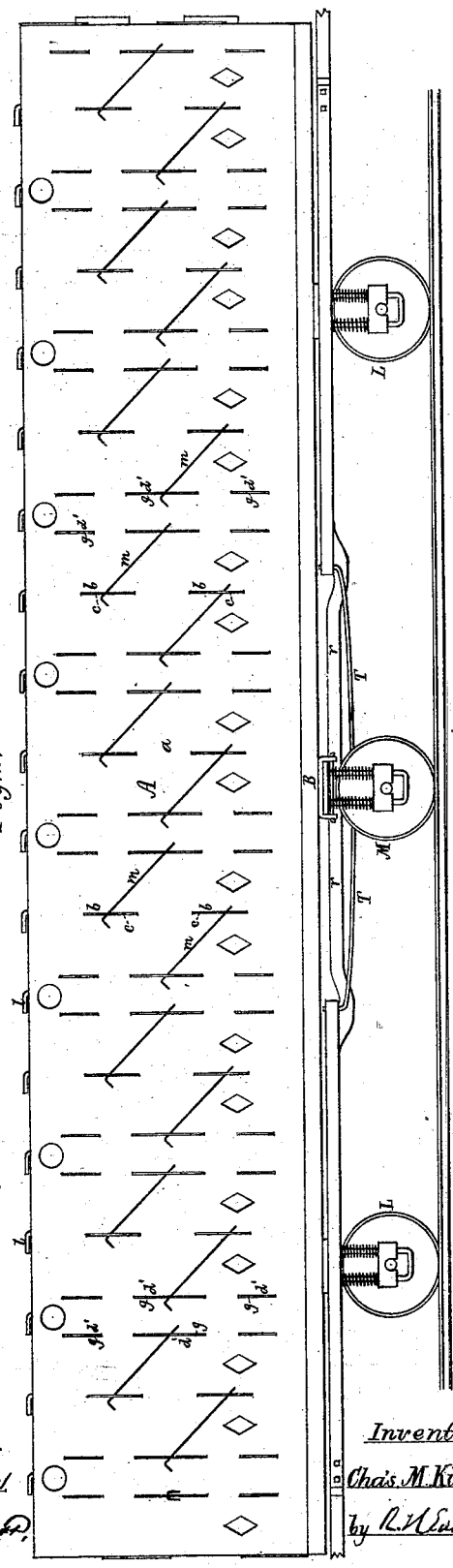
Witnesses　　　　　　　　　　　　　　Inventor.
S. N. Piper　　　　　　　　　　　　　Chas. M. Kimball.
　　　　　　　　　　　　　　　　　　by R. H. Eddy, atty (No Model.) 3 Sheets—Sheet 2.

C. M. KIMBALL.
Railway Car.

No. 238,239. Patented March 1, 1881.

Witnesses.
S. N. Piper

Inventor.
Chas. M. Kimball.
by R. N. Eddy atty (No Model.)  3 Sheets—Sheet 3.
C. M. KIMBALL.
Railway Car.
No. 238,239.  Patented March 1, 1881.
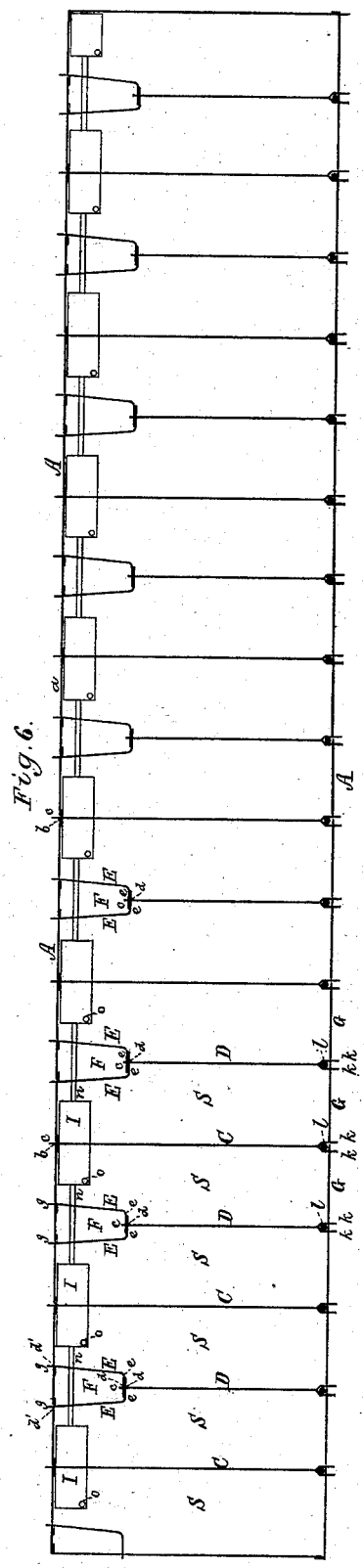
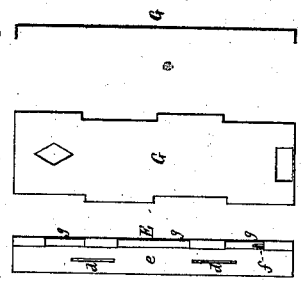
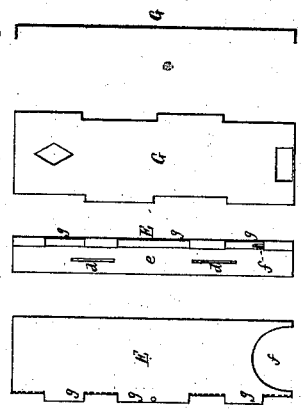
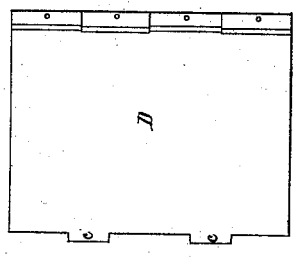
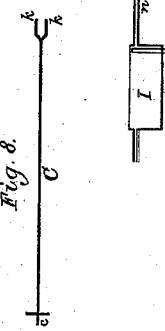
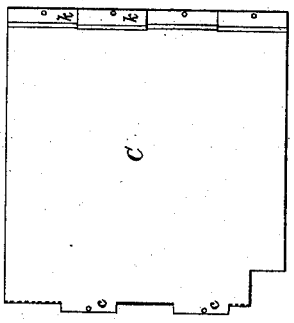
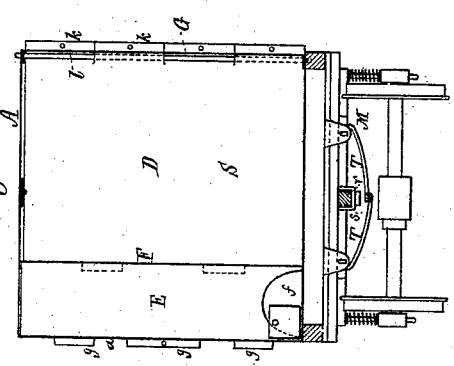
Witnesses  Inventor.
Charles M. Kimball.
by R. H. Eddy atty
N. PETERS, PHOTO-LITHOGRAPHER, WASHINGTON, D. C.

UNITED STATES PATENT OFFICE.

CHARLES M. KIMBALL, OF BRADFORD, MASSACHUSETTS.

RAILWAY-CAR.

SPECIFICATION forming part of Letters Patent No. 238,239, dated March 1, 1881.

Application filed January 10, 1881. (No model.)

*To all whom it may concern:*

Be it known that I, CHARLES M. KIMBALL, of Bradford, of the county of Essex and State of Massachusetts, have invented a new and useful Improvement in Railway-Cars for the Transportation of Cattle and Goods or Merchandise; and I do hereby declare the same to be described in the following specification and represented in the accompanying drawings, of which—

Figure 3:
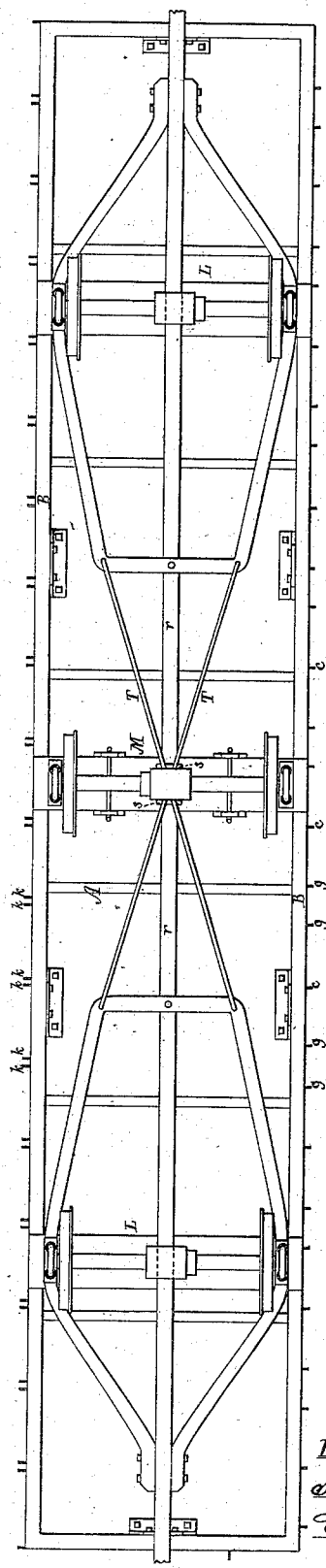
Figure 5:
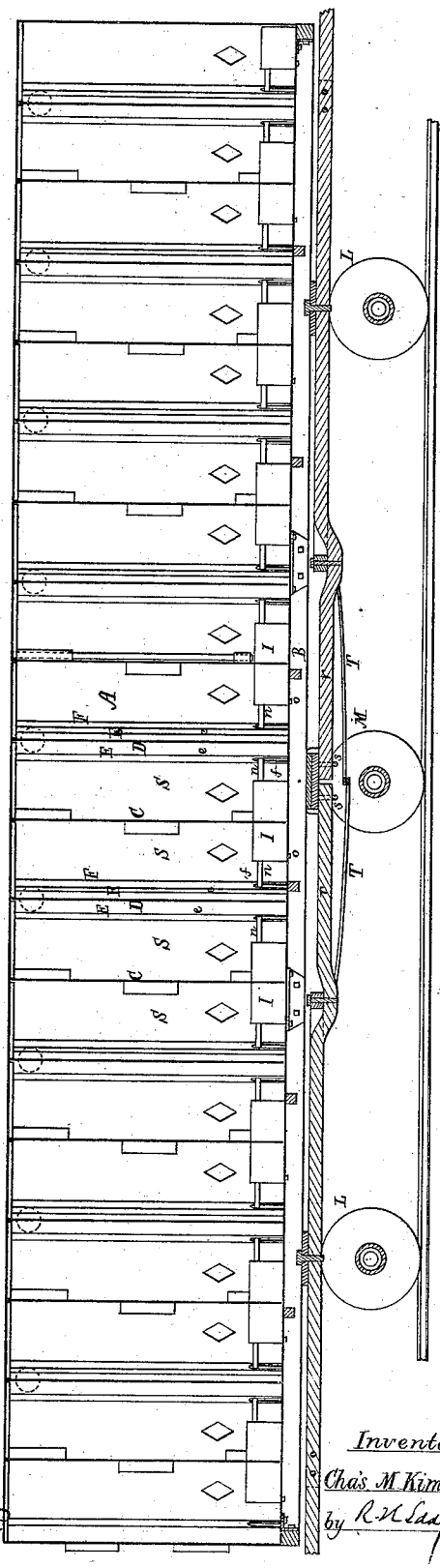

Figures 1 and 2 are opposite side elevations, Fig. 3 a bottom view, Fig. 4 a transverse section, and Fig. 5 a longitudinal and vertical section, and Fig. 6 a horizontal section, of a car containing my invention. Fig. 7 is a side view, and Fig. 8 a top view, of one of the main partitions. Fig. 9 is a side view, and Fig. 10 a top view, of one of the secondary partitions, such as are connected with a feeding-chute. Fig. 11 is a top view. Fig. 12 is a side elevation, and Fig. 13 an edge view, of one of the two plates used in composing the feeding-chute. Fig. 14 shows the arrangement of watering-troughs with their connecting and discharging conduits. Fig. 15 is a front view, and Fig. 16 an edge view, of one of the movable side plates to be described. Figs. 17 and 18 are hereinafter described.

The body of the car is open on one side, and has a series of movable transverse partitions and a series of movable side sections, which are adapted to one another and to the car-body, so as to be taken down and set up within such body, as occasion may require, whether to render it useful in the transportation of cattle, or by removal of the partitions to enable it to be used for carrying merchandise or goods, such as could not be well placed in it were the partitions set up within it in the positions in which they are when dividing the car into stalls or receptacles for cattle.

The transit of cattle on a railway is usually one way—viz., from the interior to the seaboard, or from one to another portion of the line of railway—and therefore it is desirable to have the cars so constructed that on their return-trips merchandise, or goods, or timber, or various other matters may be carried by them, in which case it would generally be necessary to take down their divisional partitions, all of which can be done with my improved car, whose trucks are capable of being automatically adjusted to the curves and straight portions of the railway-track.

A car made on my plan is intended to have its body, independently of its platform, constructed mainly, if not entirely, of plate metal or iron.

In the drawings, the car-body is shown at A as resting on a framed platform, B, suitably made. The said body is open on one side, the opposite side, a, being closed, though provided at suitable intervals with vertical slots b, to receive tenons c, extending from the vertical ends of the main transverse partitions C. There are within the body, and at suitable distances apart, main transverse partitions C and auxiliary or narrower partitions D. The tenons c of the latter series of partitions enter slots d in the flanges e of two of the plates E E, that compose the feeding-chute F, such a chute being arranged vertically between each pair of the stalls S, and opening at the lower part of its sides into them by openings f. The two plates E E, composing each feeding-chute, are provided with tenons g, to go through corresponding slots, d', made in the permanent side of the car-body, and there are to be openings through the body into the chutes for introducing hay or grain into them, such, if necessary, being done by the aid of a hopper or mouth-piece first introduced into such openings, as occasion may require.

Besides the tenons c projecting from one vertical edge of each of the transverse partitions, the other vertical edge has lips or flanges k extending from it in manner as shown. These lips are to co-operate with the side plates, G, (formed as shown in Figs. 15 and 16,) in sustaining such partitions and side plates in position, they being further so sustained, not only by vertical rods l going from the top to the bottom of the car-body, and in front of each side plate, and between the lips of its two next adjacent partition-plates, but by inclined movable rods m, formed and extended through the tenons of the partitions, such rods being arranged as shown in Figs. 1 and 2.

At the lower part of each of the stalls, and extended from it into the next adjacent stall, is a watering-trough, I, which is so connected with that or those next to it by a pipe or conduit, $n$, as to enable all of the said troughs to be supplied with water by pouring it into one of them. Each trough has also a waste-conduit, O, to open out of it, and to cause the surplus to escape after the water may have attained a suitable level in the trough.

From the above it will be seen that the car-body may have the partitions and side plates set up or taken down, as occasion may require, whether to adapt the car for the transportation of cattle or merchandise, the partitions being taken down and suitably packed within or on top of the car preparatory to using it for carrying merchandise or goods.

In order to hold the side plates in place after removal of the partitions, plates J, formed as shown in side view in Fig. 17 and in top view in Fig. 18, may be used, they being hooked on the vertical rods and having the inclined rods run through the holes $p$ of such bent plates. The plates J take the place of the tenons of the partitions.

The platform of the car rests on three trucks, L M L, the two outer ones being pivoted, over the centers of the axles of their wheels, to the platform. The trucks L L are connected with the intermediate truck by their perches $r$ being extended into staples $s$, projecting down from the intermediate truck, which is adapted to the platform so as to be capable of sliding or moving laterally under it and transversely of the car-body. Furthermore, the two trucks L L are connected by diagonal rods T T, arranged as shown, each of such rods being at its ends pivoted or jointed to the trucks. Each axle may be in two sections, fixed respectively to its wheels, and so connected as to allow each of said wheels to revolve independently of its fellow.

By having the intermediate truck applied to the platform and the main trucks and the latter arranged and connected by means as explained, a car may be made not only for the advantageous carrying of cattle, but to have its wheels easily adapt themselves to the curves of a railway.

What I claim as my invention is as follows:

1. The car-body open at one side and closed at its opposite side, and having in the closed side a series of slots, as and for the purpose described.

2. The car-body open at one side and closed at its opposite side, in combination with a series of transverse movable partitions and a series of movable side plates, all arranged and provided with means of supporting them in and of detaching them from the car-body, substantially as and for the purposes as set forth.

3. The car-body open at one side and closed at the opposite side, and provided with movable transverse partitions and side plates, as set forth, and with feeding-chutes arranged with the partitions and to open into the stalls, all substantially as explained.

4. Each feeding-chute composed of the two plates or partitions, arranged, flanged, and provided with tenons and slots, as set forth.

5. The feeding-chute composed of the two plates or partitions, arranged, flanged, and provided with tenons and slots, as set forth, in combination with its transverse connecting-partition, provided with tenons at one end to extend into the slots of the chute-plates.

CHARLES M. KIMBALL.

Witnesses:
R. H. EDDY,
E. B. PRATT.